UNITED STATES PATENT OFFICE.

WILHELM HERZBERG, OF BERLIN-WILMERSDORF, AND GERHARD HOPPE, OF BERLIN-TREPTOW, GERMANY, ASSIGNORS TO ACTIEN GESELLSCHAFT FÜR ANILIN FABRIKATION, OF BERLIN, GERMANY.

GREENISH-BLUE DYES OF THE ANTHRAQUINONE SERIES.

1,131,516. Specification of Letters Patent. Patented Mar. 9, 1915.

No Drawing. Application filed July 1, 1914. Serial No. 848,430.

*To all whom it may concern:*

Be it known that we, WILHELM HERZBERG and GERHARD HOPPE, citizens of the German Empire, and residents of Berlin-Wilmersdorf, Germany, and Berlin-Treptow, Germany, respectively, our post-office addresses being Prinzregentenstrasse 12ª, Berlin-Wilmersdorf, Germany, and Rethelstrasse 2, Berlin-Treptow, Germany, have invented certain new and useful Improvements in Greenish-Blue Dyes of the Anthraquinone Series, of which the following is a specification.

Our present invention relates to new dyes of the anthraquinone series soluble in water and dyeing wool from an acid dyeing bath greenish-blue tint of excellent fastness to light. They correspond to the general formula:

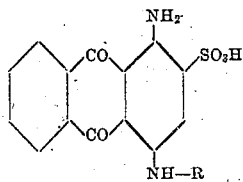

R meaning an aromatic radical.

The new dyes may be manufactured by heating a 1-amino-4-halogenanthraquinone-2-sulfonic acid with a primary aromatic amino compound in presence of water and a catalyst, such as copper or a copper compound; an agent for fixing the acid eliminated is not absolutely necessary but may be used. If the amino compound employed for the condensation with the 1-amino-4-halogenanthraquinone-2-sulfonic acid contains no sulfonic group the dye may be made more soluble by sulfonation.

The new dyes are in the dry pulverized shape dark blue powders soluble in water with greenish-blue color; with strong acids they form salts, for example with hydrochloric acid blue-red hydrochlorids.

The following example, the parts being by weight, illustrate the manufacture of the dye. 20 parts of 1-amino-4-bromoanthraquinone-2-sulfonic acid, 12 parts of calcined sodium carbonate, 1 part of crystallized copper sulfate and 60 parts of 4-toluidin are heated together in 1000 parts of water for 30 minutes at 80°–90° C. Already after a few minutes the solution is brilliantly blue. When the reaction is complete the excess of toluidin is distilled in steam and the dye solution acidified. The dye crystallizes in pure form. It consists of 4-para-tolylamino-1-aminoanthraquinone-2-sulfonic acid of the formula:

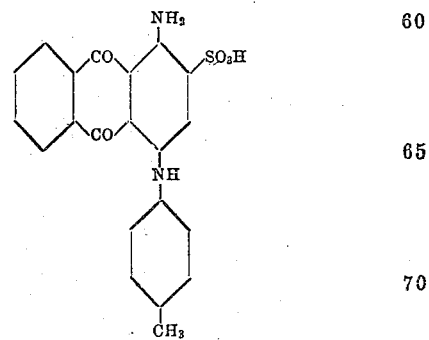

and is a blue crystalline powder which, as also the sodium salt, dissolves in water to a greenish-blue solution. From the feebly acid or alkaline solution strong acids precipitate corresponding salts, for instance hydrochloric acid precipitates the blue-red hydrochloric crystallizing in needles. Wool is dyed clear greenish-blue tints.

If in the foregoing example the 4-toluidin is replaced by other aromatic amins, for instance by 2-naphthylamin, similar dyes are produced.

Having now particularly described our invention what we claim is,—

1. The new dyes which are in the dry pulverized shape dark blue powders soluble in water with a greenish-blue color, which form with hydrochloric acid blue-red hydrochlorids, which dye wool greenish-blue tints and which correspond to the general formula:

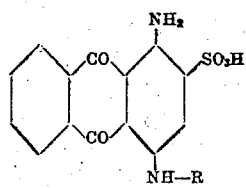

R meaning an aromatic radical.

2. The new dye which is in the dry pulverized shape a dark blue powder soluble in water with a greenish-blue color, the dye forming with hydrochloric acid a blue-red hydrochlorid, the dye producing on wool greenish-blue tints and consisting of 4-paratolylaminoanthraquinone-2-sulfonic acid of the formula:

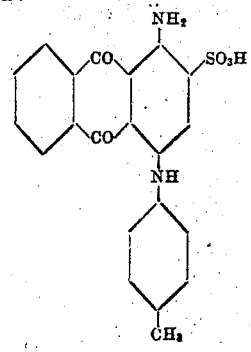

In testimony whereof we have hereunto set our hands in presence of two subscribing witnesses.

WILHELM HERZBERG.
GERHARD HOPPE.

Witnesses:
 HENRY HASPER,
 WOLDEMAR HAUPT.